United States Patent [19]

Tarascon

[11] Patent Number: 5,425,932
[45] Date of Patent: Jun. 20, 1995

[54] METHOD FOR SYNTHESIS OF HIGH CAPACITY $Li_xMn_2O_4$ SECONDARY BATTERY ELECTRODE COMPOUNDS

[75] Inventor: Jean-Marie Tarascon, Martinsville, N.J.

[73] Assignee: Bell Communications Research, Inc., Livingston, N.J.

[21] Appl. No.: 64,247

[22] Filed: May 19, 1993

[51] Int. Cl.[6] .......................... C01G 45/12; H01M 4/50
[52] U.S. Cl. ....................................... 423/599; 429/224
[58] Field of Search .......................... 423/599; 429/224

[56] References Cited

U.S. PATENT DOCUMENTS

| | | | |
|---|---|---|---|
| 4,246,253 | 1/1981 | Hunter | 423/605 |
| 4,567,031 | 1/1986 | Riley | 423/599 |
| 5,110,696 | 5/1992 | Shokoohi et al. | 423/599 |
| 5,114,910 | 5/1992 | Josefowicz et al. | 505/1 |
| 5,240,794 | 8/1993 | Thackeray et al. | 423/599 |

FOREIGN PATENT DOCUMENTS 2221213  1/1990  United Kingdom ................ 423/599

OTHER PUBLICATIONS

Wickham, D. G., "Crystallographic and . . . Spinels Containing Trivalent JA-1044 Manganese", J. Phys. Chem. Solids, 1958, vol. 7, pp. 351-360.

*Primary Examiner*—Steven Bos
*Attorney, Agent, or Firm*—Leonard C. Suchyta; Lionel N. White

[57] ABSTRACT

Lithium intercalation compounds suitable for use in high capacity secondary battery electrodes are prepared by reacting together at a temperature in the range of about 800° to 900° C. lithium and manganese compounds in a stoichiometric ratio resulting in a $Li_xMn_2O_4$ compound wherein x is within the range of about 1.00 to 1.20. The resulting compound is annealed at a temperature in excess of about 800° C. and cooled to at least about 500° C. at the rate less than about 10° C. per hour before being finally cooled to ambient working temperature. Intercalation electrodes comprising these lithiated compounds are used in secondary batteries to yield stable, extended capacities in excess of 110 AHr/Kg.

4 Claims, 5 Drawing Sheets

METHOD FOR SYNTHESIS OF HIGH CAPACITY $Li_xMn_2O_4$ SECONDARY BATTERY ELECTRODE COMPOUNDS

BACKGROUND OF THE INVENTION

This invention relates to secondary, rechargeable lithium and lithium ion batteries, and more particularly relates to the synthesis of $Li_xMn_2O_4$ intercalation compounds adapted for use as battery electrodes which provide extended high capacity.

On the basis of their economy, electrochemical efficacy, and environmental acceptability, $Li_xMn_2O_4$ intercalation compounds have shown exceptional promise as electrode materials in secondary batteries for all manner of portable electrical power needs. Such materials have been used with outstanding success in positive electrodes for batteries comprising lithium metal, as well as in positive lithium source intercalation electrodes for lithium ion batteries comprising, for example, intercalatable carbon electrodes.

$Li_xMn_2O_4$ electrode compounds have for some time generally been synthesized in a simple endothermic reaction between stoichiometric quantities of a lithium salt and a manganese oxide. Common precursors are, for example, the $Li_2CO_3$ and $MnO_2$ compounds discussed by Hunter in U.S. Pat. No. 4,246,253. The spinel in which the lithium content, x, nominally approximates 1 is shown by Hunter to be readily obtained by heating a 2:1 mole ratio mixture of Mn:Li at 800°–900° C. for a time to ensure thorough reaction, and then cooling to ambient working temperature, usually room temperature. Although Hunter's intent was the further acidifying reaction of the resulting $LiMn_2O_4$ to derive a new $\lambda$-$MnO_2$ compound, the simple thermal reaction has been widely utilized to prepare the spinel, $LiMn_2O_4$, for use in various types of battery electrodes.

In U.S. Pat. No. 4,828,834, Nagaura et al. noted the limited charge capacity exhibited by battery cells comprising electrodes fashioned of $LiMn_2O_4$ prepared by Hunter's high-temperature method. The invention disclosed by Nagaura et al. was intended to improve the charge capacity of such batteries at the 3.2V intercalation plateau and entailed a variation in the Hunter process to essentially limit the reaction, or sintering, temperature of the Li- and Mn-source compound mixture to about 500° C. The resulting unique material was, however, only partially crystallized at these lower temperatures and could not provide the higher potential capacity of the fully-crystallized spinel phase electrode. This is apparent from Nagaura's broad 2° x-ray diffraction peak as compared with the approximately 0.1° peaks observed in true crystalline spinel materials such as prepared by Hunter, or according to the present invention.

Thus there remained the dilemma of restricted choice between significant, but the short-lived capacity of $Li_xMn_2O_4$ intercalation compounds synthesized at high temperature, or the more stable, but lesser initial capacity of such compounds processed at temperatures below their effective crystallization range.

SUMMARY OF THE INVENTION

Extensive study of the thermal synthesis of intercalation compounds has led to the discovery in the present invention that electrode materials of high, stable charge capacity may be prepared by heating a Li- and Mn-source compound mixture in air to a temperature in excess of about 800° C. for a time sufficient to ensure optimum crystallization and cooling the resulting compound to at least about 500° C. at a controlled rate of less than about 10° C./hr before further cooling to ambient working temperature.

This unique process apparently remedies the instabilities in the compound which are created at the initial high processing temperature and which result in the limited charging capacity of the ultimate electrodes. Such instabilities may be due to the likely existence of conditions at temperatures in excess of 800° C. which lead to a substantial reduction of some manganese ions to the $Mn^{++}$ state in which they later exhibit a significant solubility in an organic battery cell electrolyte. The common practice of relatively rapid, uncontrolled cooling of synthesized $LiMn_2O_4$, as typified by Hunter's examples, apparently maintains the reduced manganese ions in their lower valence state, whereas the controlled slow cooling step of the present invention provides sufficient reaction time at the lower temperature for these ions to reoxidize to their preferred $Mn^{+4}$ or $Mn^{+3}$ state.

It appears also that the slow cooling of the synthesized spinel through the critical temperature range of about 800° to 500° C. enhances other properties of the compound in order to achieve about 96% of theoretical cell capacity. Extension of the 4.9V intercalation peak and the concurrent suppression of the 4.5V peak, as well as reduction of the cubic spinel a-axis parameter to less than about 8.23 Å in the preferred range of lithium content, are further characteristic of the $Li_xMn_2O_4$ compounds prepared according to the present invention.

BRIEF DESCRIPTION OF THE DRAWING

The present invention will be described with reference to the accompanying drawing of which.

DESCRIPTION OF THE INVENTION

Figure 1:
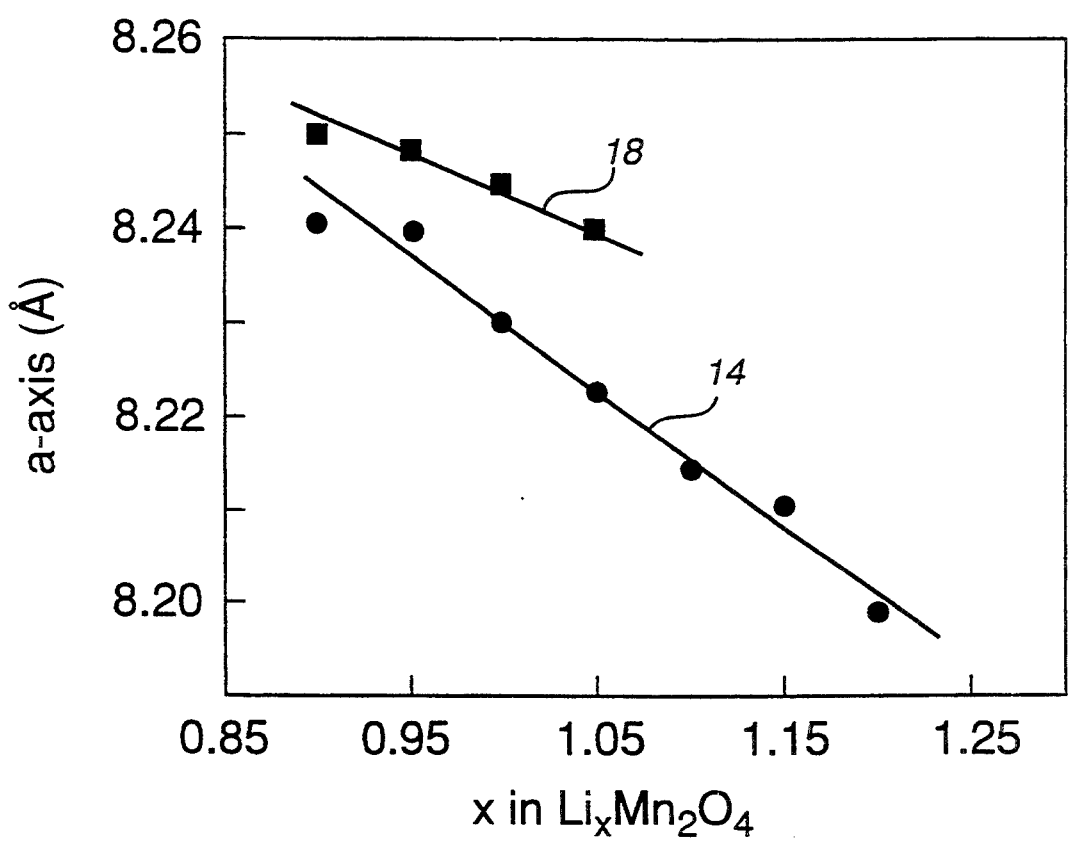
FIG. 1 presents graph traces showing comparative a-axis parameters of various rapidly- and slowly-cooled $Li_xMn_2O_4$ compounds.

During recent studies of lithium battery intercalation electrode materials, particularly the promising $Li_xMn_2O_4$ compounds, it was observed that the temperature conditions at which the common thermal synthesis of the compounds according to Hunter was conducted, that is, the annealing temperature at which the precursor lithium and manganese compounds were reacted and the rate at which the resulting materials were cooled, greatly influenced the properties of the final compounds. For instance, although the various $Li_xMn_2O_4$ compounds were confirmed by x-ray diffraction as being the typical crystalline spinel, the cubic a-axis parameter of slowly-cooled samples, e.g., those cooled from about an 800° C. annealing temperature at less than about 10° C./hr, was significantly smaller, seldom exceeding about 8.23 Å in nominal formulations with x greater than about 1.0. These differences can be seen more clearly in the graph of FIG. 1 in which the a-axis parameter is plotted for various compound compositions which were slowly cooled (trace 14) and for those which were quenched (trace 18) at a cooling rate in excess of about 40° C./min.

Figure 2:
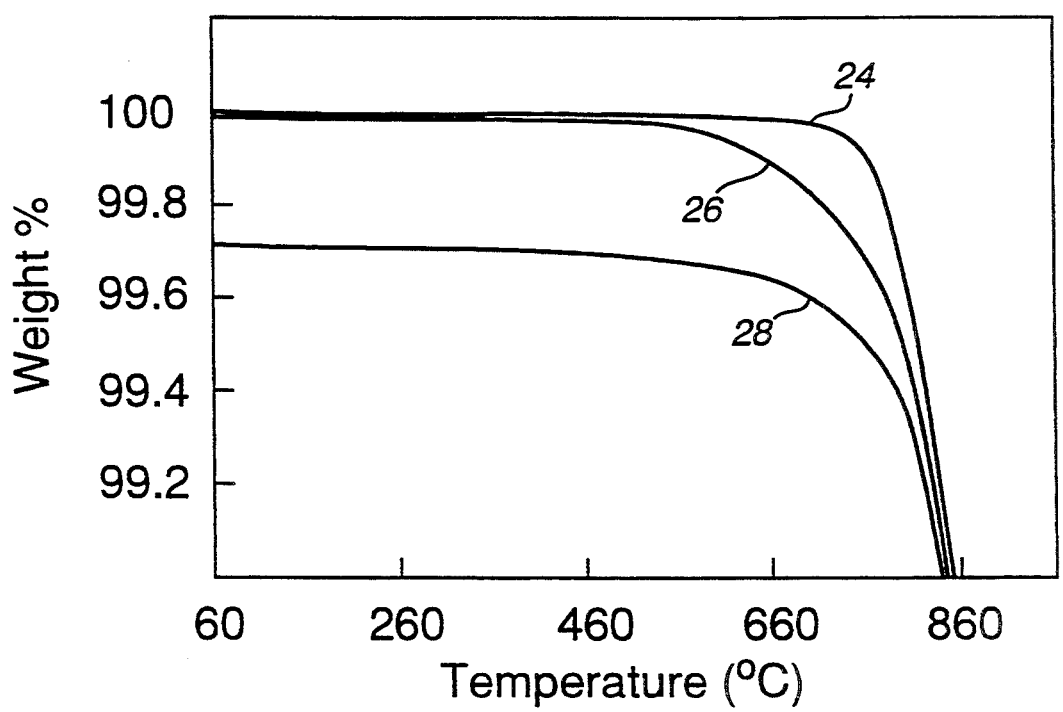
FIG. 2 presents graph traces showing comparative weight loss of rapidly- and slowly-cooled samples of a $Li_xMn_2O_4$ compound.

Subsequently, upon thermogravimetric examination, such slowly-cooled samples which were reheated gradually (trace 24 in FIG. 2) to a normal annealing temperature in excess of about 800° C. exhibited a substantial, permanent weight loss when quenched back to ambient temperature. On the other hand, when similar samples were cooled from the annealing temperature at a controlled rate of less than about 10° C./hr, little final weight loss was observed. Typical results of such treatment can be seen in FIG. 2 for slowly-cooled (trace 26) and quenched (trace 28) samples. The critical nature of the cooling operation was confirmed when the quenched sample returned to substantially its original weight after being reheated to annealing temperature and slow-cooled to ambient temperature over the extended time period.

Figure 3:
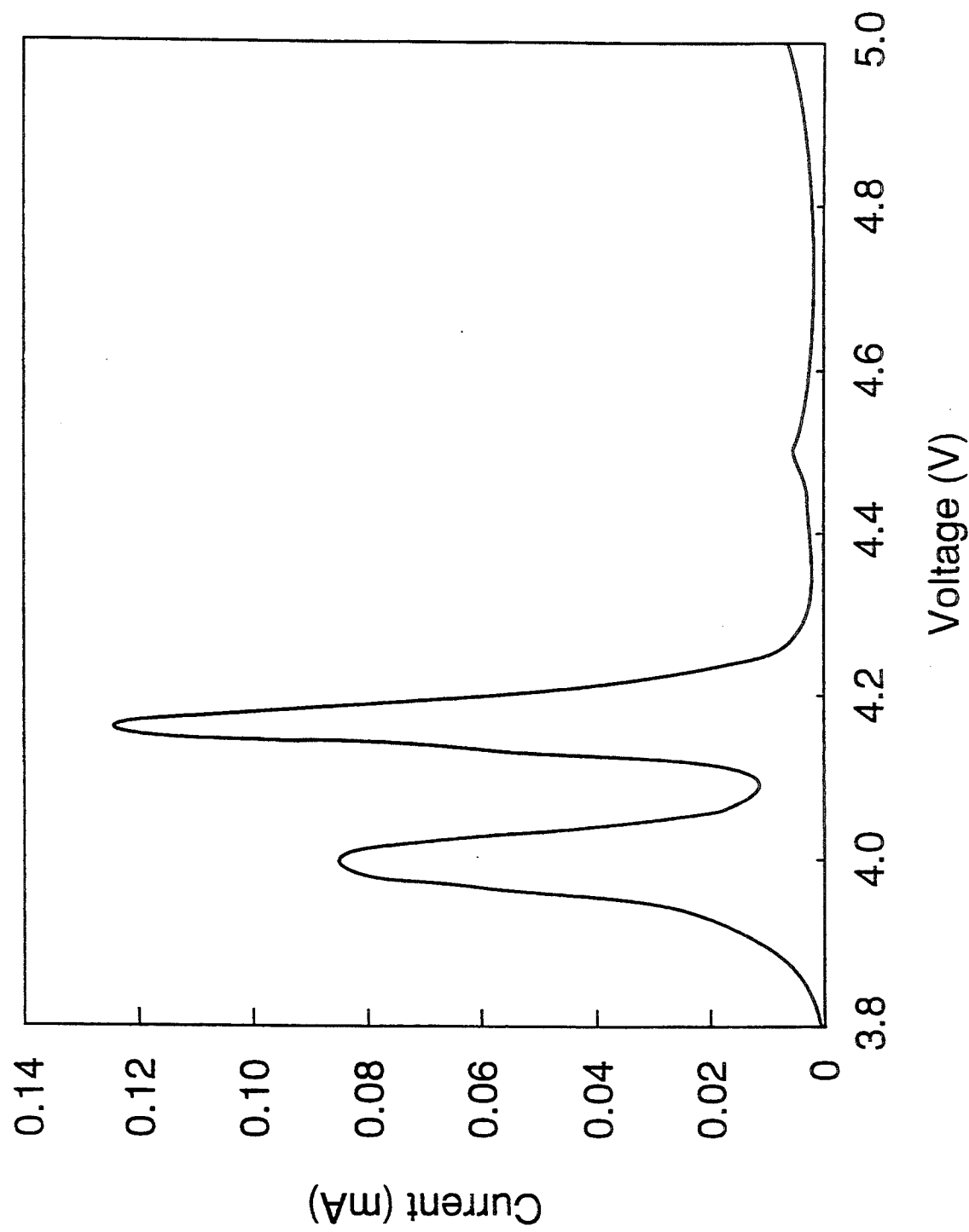
FIG. 3 is a cyclic voltammogram of a secondary battery cell comprising $Li/Li_xMn_2O_4$ electrodes showing a typical variation in current with applied voltage.

Cyclovoltammetry studies of $Li_xMn_2O_4$ electrode battery cells have established the predominance of Li intercalation peaks at about 4.0 and 4.2V vs Li during the cell charging cycle. This removal of Li ions from the spinel electrode in a Li-ion cell embodiment accounts for about 90% of the theoretical capacity of such a cell. The capability of conducting such cell studies at higher voltages has been more recently provided by improved electrolyte compositions. The resulting studies have revealed additional intercalation peaks at about 4.5 and 4.9V vs Li which can theoretically provide an additional 6% cell capacity. These intercalation peaks are apparent in the typical cyclovoltammetry trace of a cell charging cycle shown in FIG. 3.

For electrode studies of materials of the present invention, series of $Li_xMn_2O_4$ compounds varying in the proportion of lithium, x, were prepared both according to prior practices and according to the current innovative method. These procedures were essentially identical with the exception of the operation of cooling the compounds after the synthesis annealing. Stoichiometric proportions of $Li_2CO_3$ (other lithium compounds, such as LiOH, LiI, or $Li_2NO_3$ might similarly be employed) and $MnO_2$ (or another manganese source, such as its acetate or hydroxide compound) were thoroughly mixed and heated in air at about 800° C. for about 72 hours. Thus, for example, 0.923 gm of $Li_2CO_3$ was combined with 4.346 gm of $MnO_2$ to obtain the nominal $LiMn_2O_4$, while 0.9695 gm of $Li_2CO_3$ was used to obtain a preferred compound in which x was 1.05. The samples were then cooled to a working ambient (typically, room temperature), ground to powder, and reheated to the annealing temperature. This process was repeated once again to ensure complete crystallizing reaction in the compositions. One series of samples, varying in the range of x from 0.75 to 1.20, was then "rapidly" cooled to room temperature, in the manner of prior processing, over a period of about 2 hours. The other series of similar x range was "slowly" cooled at a rate of less than about 10° C./hr, preferably at about 2°–3° C./hr, to a temperature of about 500° C. before the annealing furnace was turned off and the samples allowed to rapidly cool to room temperature. The samples were then completed by grinding to a fine powder.

Figure 4:
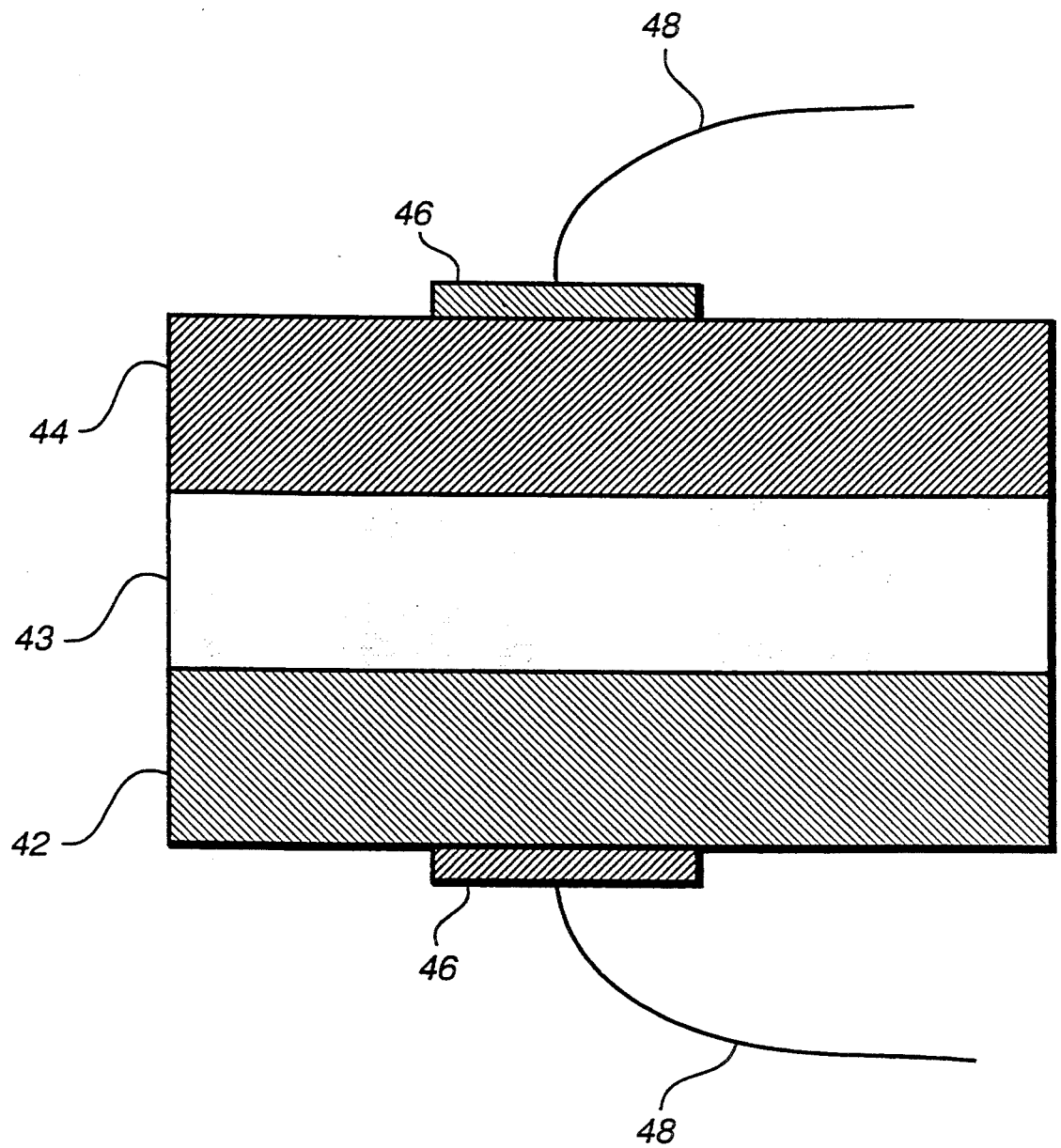
FIG. 4 shows a representative battery cell, in cross-section, utilizing an electrode comprising a $Li_xMn_2O_4$ intercalation compound prepared according to the present invention.
Figure 5:
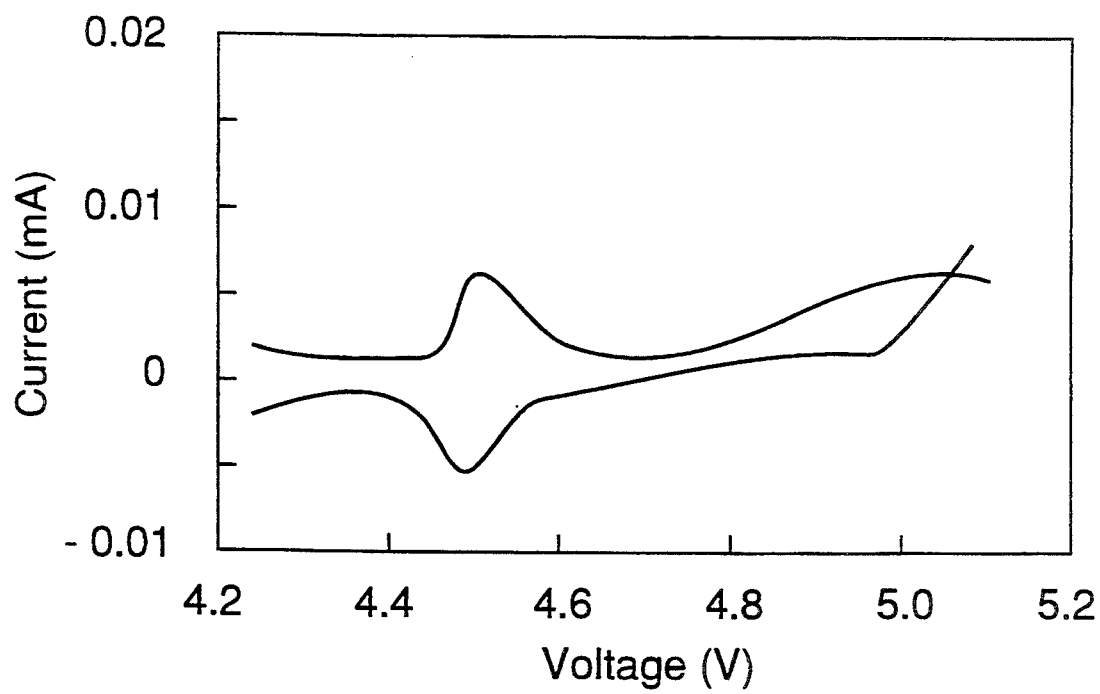
FIG. 5 is a portion of a voltammogram of FIG. 1 presented at increased scale to show the predominant 4.5V intercalation peak indicative of rapid cooling during synthesis of $Li_xMn_2O_4$.

Each of the samples was used to form a positive cell electrode in the normal manner by mixing the powdered $Li_xMn_2O_4$ compound with about 5% carbon black and 5% polyvinylidene fluoride in 2-methyl phthalate, coating the resulting slurry onto an aluminum substrate, and heating for a time at about 200° C. Swagelock test cells, as represented in FIG. 4, were assembled using lithium metal foil as the negative electrode 42, an electrolyte separator layer 43 prepared of a 1M solution of $LiPF_6$ in a 33:67 mixture of dimethylcarbonate and ethylene carbonate, and a positive sample electrode 44. Electrically conductive contacts 46 and leads 48 completed each cell. The cells were then tested over repeated C/3 charging cycles (one complete charge/discharge in 3 hours) using a potentiostatic mode coulometer (CRNS, Grenoble, France, Model "MacPile", version A-3.01e/881). During the tests, the voltage was varied from the open circuit level (about 3.4V) to the 5.1V limit of the instrument and then to about 4.25V for subsequent repeated cycling between 4.25 and 5.1V to obtain cyclovoltammetry traces, such as those shown in enlarged scale in FIGS. 5 and 6, in the range of the high-end intercalation peaks at 4.5 and 4.9V. The cycling voltage ranges were varied for other test series, as noted below.

Figure 6:
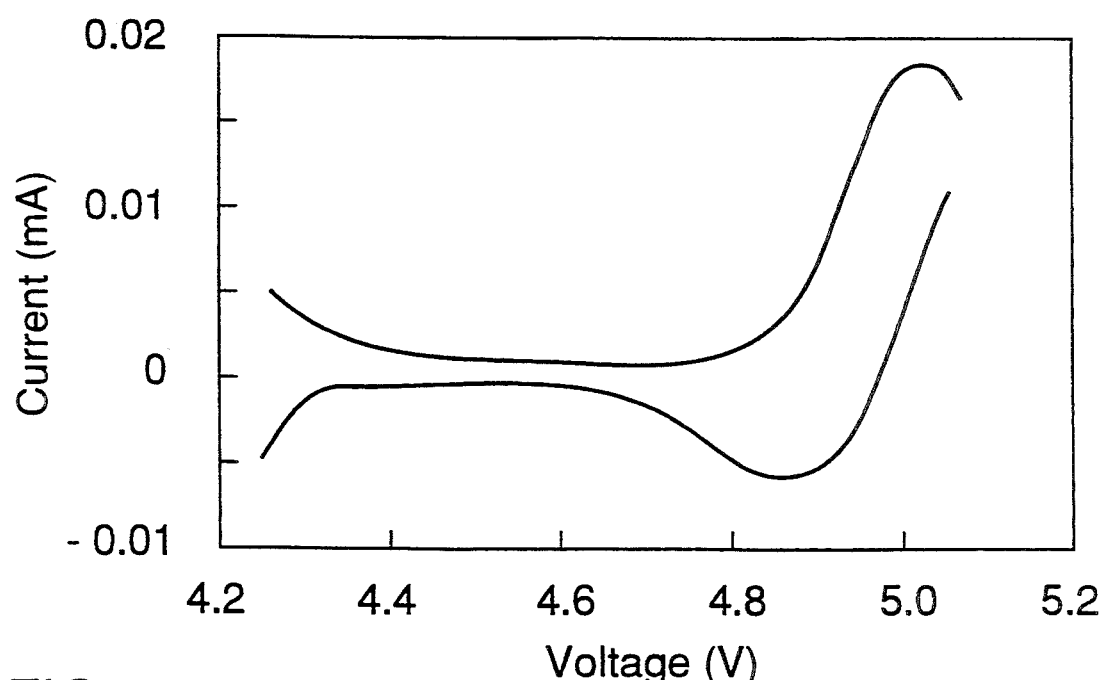
FIG. 6 is a portion of a voltammogram of FIG. 1 presented at increased scale to show the predominant 4.9V intercalation peak indicative of controlled slow cooling during synthesis of $Li_xMn_2O_4$ according to the present invention.

A significant relationship between the cooling step of the synthesis process and the predominance of one or the other of the intercalation peaks was observed from these cycling tests. As typified in the traces of $Li_{1.05}Mn_2O_4$ shown in FIGS. 5 and 6, the peaks at 4.5V predominated in the rapidly-cooled samples (FIG. 5), while those at the preferred 4.9V were the more outstanding in the slowly-cooled samples (FIG. 6). These cycling tests thus served as a means for distinguishing between $Li_xMn_2O_4$ electrode compounds prepared with uncontrolled rapid cooling according to prior procedures and the more stable, reoxygenated compounds provided by the present synthesis process.

Figure 7:
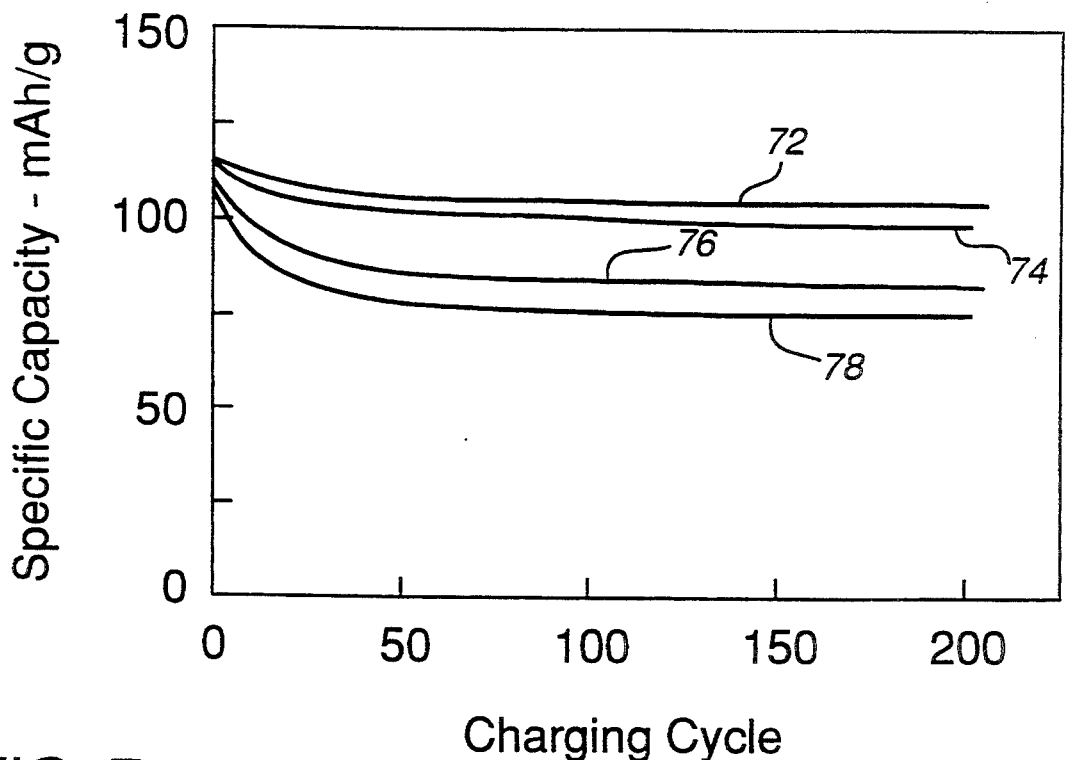
FIG. 7 presents a series of graph traces showing the comparative variations of charge capacity over extended charging cycles for cells comprising rapidly-cooled $Li_xMn_2O_4$ and slowly-cooled $Li_xMn_2O_4$ of the present invention.

The distinctive improvement in extended cell charging capacity resulting from the present process is shown in FIG. 7 which charts variations in charging capacity, normalized as milliamp hours per gram of intercalation compound to account for differences in actual electrode weights. Traces 72 and 74 show the more stable maintenance of capacity in a preferred slow-cooled material, e.g., the $Li_{1.05}Mn_2O_4$ compound of the previous FIGS., over respective 3–4.7V and 3–4.5V C/3 charging cycles. By contrast, the rapid cooling of prior processes resulted in electrode materials which exhibited an immediate loss of about 30% of initial capacity over the first 50 cycles as shown by traces 76 and 78 for the respective 3–4.7V and 34.5V C/3 charging cycles.

Figure 8:
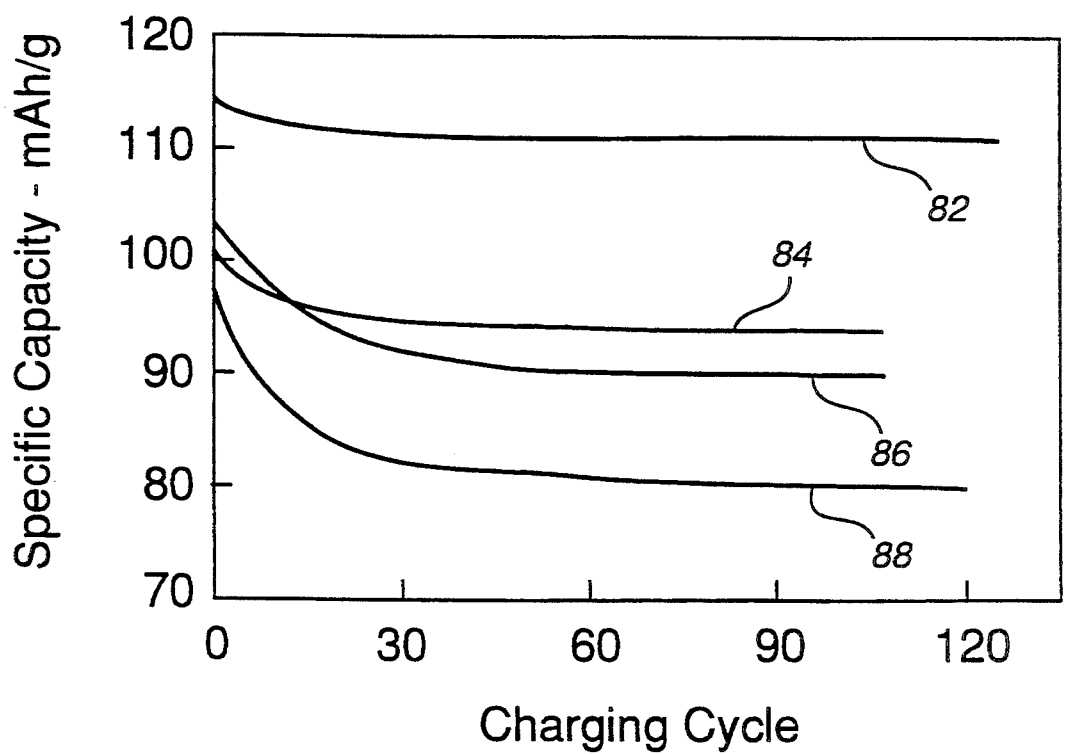
FIG. 8 presents a series of graph traces showing the comparative variations of charge capacity over extended charging cycles for cells comprising slowly-cooled $Li_xMn_2O_4$ of the present invention having different levels, x, of lithium content.

The extended 3–4.5V C/3 cycling tests also revealed a significant variation in the capacity and stability of cells as a function of the initial amount of lithium in the intercalation compounds synthesized by the slow-cooling method of the invention. This effect of the variation of x in the $Li_xMn_2O_4$ compounds is shown in FIG. 8 where trace 82 indicates an optimum formulation where x is about 1.05. Traces 84 and 86 show effects of varying x to about 1.10 and 1.00, respectively, within which range the spinel is in a single phase. The effect of a deficiency of lithium on initial and extended cell capacity is shown in trace 88 where x is about 0.90.

A series of lithium-ion battery cells was constructed from the $Li_xMn_2O_4$ compounds prepared according to this invention. In these cells, the previous lithium foil electrode 42 was replaced by a carbon electrode fashioned of a paste of powdered petroleum coke in a polyvinylidene binder solution coated and dried on a copper foil substrate. Graphite may likewise be used as an alternative form of carbon. In such a cell structure the carbon serves as the negative electrode and intercalates, during the charging cycle, the Li-ions derived from the $Li_xMn_2O_4$ positive electrode. Tests of repeated charge cycling showed cell capacities comparable to those previously described for the lithium cells using $Li_xMn_2O_4$ spinels synthesized with slow cooling from annealing temperatures in excess of about 800° C. After extended recharging over as many as 4000 cycles, a representative cell was disassembled and the electrodes were examined. The positive electrode $Li_xMn_2O_4$ continued to exhibit well-defined crystallinity under X-ray diffraction study.

In the foregoing examples the working ambient for synthesis of the $Li_xMn_2O_4$ was air. It should be apparent to the skilled artisan in the light of this disclosure, however, that the controlled cooling operation could likewise be carried out in an oxygen-enriched atmosphere, in which event the cooling rate might be increased to a range of about 10°–30° C./hr with similar results. These and other apparent variations are also intended to be included within the scope of the present invention as recited in the appended claims.

What is claimed is:

1. A method of synthesizing a $Li_xMn_2O_4$ intercalation compound wherein x ranges from about 1.00 to 1.20 which comprises reacting a mixture of at least one each of a lithium compound and a manganese compound at a temperature of at least about 800° C. to form a product characterized in that a) said mixture comprises a mole ratio of about 1.00 to 1.20 moles of lithium per 2.00 moles of manganese; and b) the product is finally cooled, from about 800° C. to at least about 500° C. at a rate of less than about 10° C. per hour in air, thereby to obtain an a-axis parameter $\leq 8.23$ Å for said compound.

2. A method according to claim 1 wherein the product is finally cooled at a rate of about 2°–3° C. per hour.

3. A method according to claim 1 wherein said lithium compound is selected from the group consisting on $Li_2CO_3$, LiOH, LiI, and $Li_2NO_3$.

4. A method according to claim 3 wherein said manganese compound is selected from the group consisting of manganese oxide, manganese acetate, and manganese hydroxide.

* * * * *